W. F. VERNIER.
Carriage-Clip.
No. 40,583.
Patented Nov. 10, 1863.
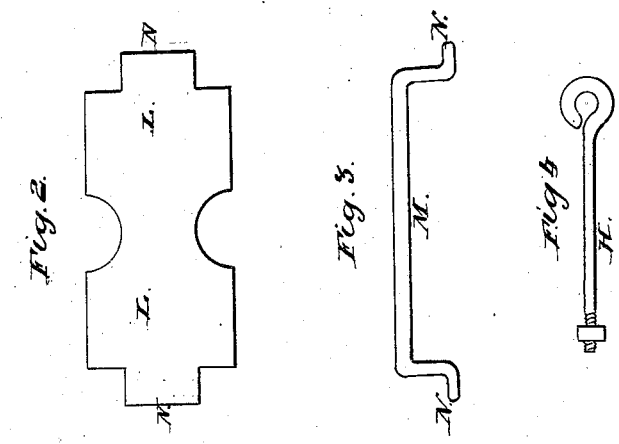
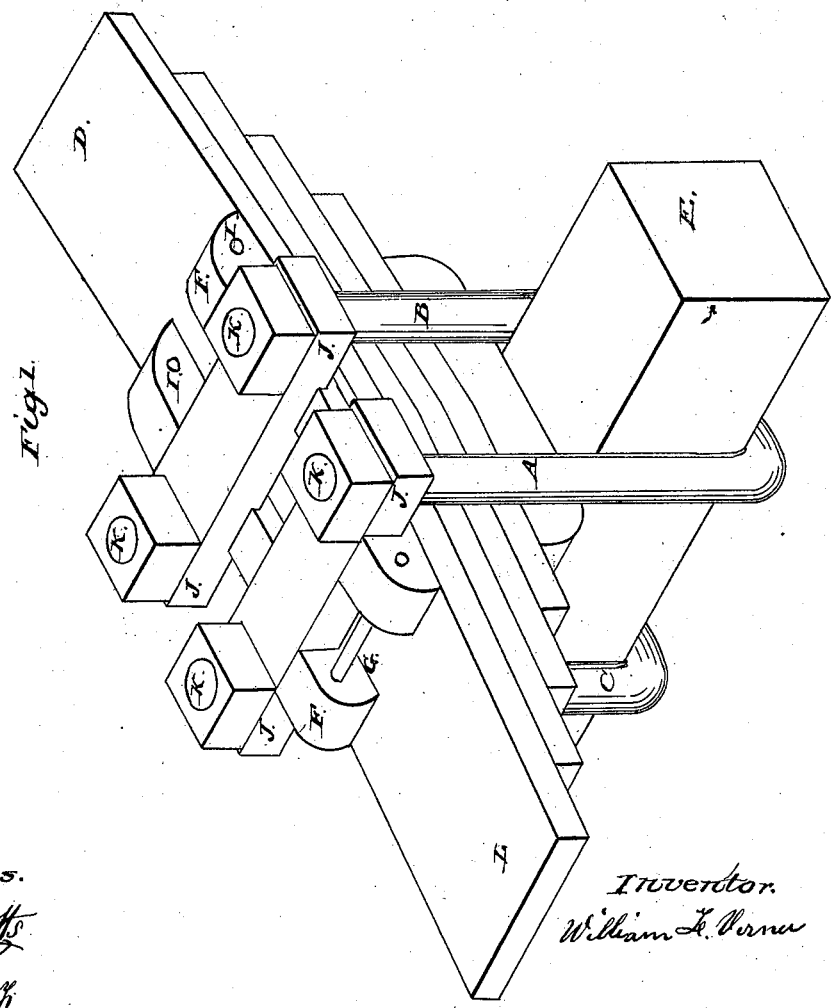

UNITED STATES PATENT OFFICE.

WILLIAM F. VERNIER, OF PHILADELPHIA, PENNSYLVANIA.

IMPROVEMENT IN DEVICES FOR LOCKING SCREW-NUTS.

Specification forming part of Letters Patent No. 40,583, dated November 10, 1863.

*To all whom it may concern:*

Be it known that I, WILLIAM F. VERNIER, of the city of Philadelphia, in the State of Pennsylvania, have invented a new and useful device for preventing the loosening or displacement of nuts of screws on clips and other car or wagon work; and I do hereby declare that the following is a full and exact description thereof, reference being had to the accompanying drawings, and to the letters of reference marked thereon, making part of this specification.

Figure 1 is a perspective view of a clip applied to hold together the spring and axle. In this figure A B C represent the clips; D D, the spring, and E the axle. F F are the spring or clamp plates or bars; J J J J, the clip plates or bars; K K K K, the nuts on the ends of the screws of the clips. The above representation shows the ordinary clip as constructed and formed to unite the spring and axle together. It is found by experience that the nuts K K on the screw ends of the clips, and, in fact, all the other nuts as ordinarily applied and used on cars or wheeled vehicles, from constant use will become in time loose and deranged, and consequently allow the parts intended to be clamped and fastened together to play and move about and get loose, and thus endanger and impair the strength of the work. To prevent the nuts on the ends of the screws from thus becoming loose or displaced after they have been screwed up tight and brought home to their intended places. I propose to construct and apply a metallic plate, as shown at L L in Fig. 2, whereof a longitudinal section is shown at M in Fig. 3. This plate has the wings or lugs N N constructed and formed on each end thereof. The spring or clamp plates or bars F F have the rod G permanently fitted and riveted into them. The other ends of these plates or bars have the holes I I drilled or formed in them for the reception of a movable rod or bolt, H, Fig. 4. After the nuts K K are brought home to their places, the plate L L is then applied by placing one of the lugs N N under the permanent rod G, and the other lug is to be brought down between the holes I I, and the rod M, then run through these holes, so as to confine the lug below it, and then fastened therein by riveting or by a small nut on the end thereof, as shown in Fig. 4. The plate L L, when brought down between the nuts K K, is made to fit tightly in between them, so as to prevent the possibility of these nuts turning on the screws to which they are applied or becoming loose or displaced in the slightest degree.

In the drawings has been shown the device as applied to clips. It is however obvious that the same is applicable not only to clips, but to all similar work on cars or wheeled vehicles where two or more nuts are placed in juxtaposition to each other.

I do not claim the application and use of the clamp or spring plates F F, as these are well known and frequently used; but What I do claim as my invention, and desire to secure by Letters Patent, is—

The plate L L, with the lugs N N, and the rods G and M, constructed and applied substantially as above described, and for the purposes set forth.

WILLIAM F. VERNIER.

Witnesses:
 ALBERT POTTS,
 CHAS. B. SMITH.